Dec. 27, 1966     E. A. LAWTON ET AL     3,294,495
METHOD OF PREPARING DIFLUORAMINE
Filed Sept. 15, 1959

INVENTORS
EMIL A. LAWTON
JOHN Q. WEBER
BY
*Thomas S. MacDonald*
ATTORNEY

United States Patent Office 3,294,495
Patented Dec. 27, 1966

3,294,495
METHOD OF PREPARING DIFLUORAMINE
Emil A. Lawton, Woodland Hills, and John Q. Weber, Topanga, Calif., assignors to North American Aviation, Inc.
Filed Sept. 15, 1959, Ser. No. 840,066
4 Claims. (Cl. 23—356)

The present invention is directed to a novel method of preparing difluoramine and preparing tetrafluorohydrazine therefrom. More particularly, the invention is directed to a fluorination process of preparing difluoramine and a catalytic process of preparing tetrafluorohydrazine from the prepared difluoramine.

The products of the processes herein described find use as storable oxidizers and monopropellants for use in rocket engine applications and, further, are useful in preparing intermediates useful in the preparation of other compounds containing a nitrogen-fluorine bond. The process herein disclosed is cheaper than the only known prior art process due to the fact that the methods are carried out at ambient temperatures and pressures and the fact that better yields are obtainable.

Tetrafluorohydrazine which is made by the herein described method has recently been reported in the Journal of the American Chemical Society, vol. 80, at p. 5004 (1958). It was prepared by the reaction of $NF_3$ with metals at temperatures of 350° to 450° C. in the presence of such metals as copper and arsenic. One particular species of the concerned method of making tetrafluorohydrazine uses as a catalyst certain solid residues from the distillation of fluorinated urea formed during the making of difluoramine by the herein disclosed process.

An object of this invention is to provide a method of making difluoramine.

A further object of this invention is to provide a method of making tetrafluorohydrazine from difluoramine.

A still further object of this invention is to provide a satisfactory process of fluorinating urea and other nitrogen compounds to form difluoramine.

An additional object of this invention is to provide a method of reacting difluoramine in the presence of a suitable catalyst such as a catalyst formed in the fluorination of urea, to form tetrafluorohydrazine.

A further object of this invention is to provide a method of making monopropellants having a nitrogen-fluorine bond.

A still further object of this invention is to provide a process of making difluoramine and tetrafluorohydrazine oxidizers which are useful as rocket propellants.

Further objects to this invention will be apparent from the following description taken in conjunction with the accompanying drawing, in which.

Basically, the preparation of difluoramine involves the steps of fluorinating a nitrogen compound containing amide and imide linkages such as urea, biurea, biuret, aminoguanidine, diaminourea, or 5-aminotetrazole by gaseous fluorine source such as fluorine gas diluted with an inert gas such as nitrogen and both liquid and gaseous products are obtained which contain NF bonds. In heating the liquid products difluoramine is obtained along with other gases and can be purified by low temperature fractional condensation. The tetrafluorohydrazine is in turn prepared from difluoramine by a decomposition process entailing the treatment of difluoramine in the presence of certain solid materials an example of which is the solid residue from the above distillation of fluorinated urea. The process of formation of difluoramine may be illustrated by the following equation:

(1) 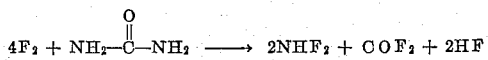

Alternatively, the reaction may be written as shown in Equation 2 since the bulk of the fluorine used was found in the initial liquid product.

(2) 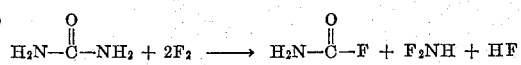

The Equation 3 for the decomposition of difluoramine to tetrafluorohydrazine is:

(3) 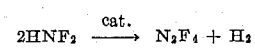

Figure 1:
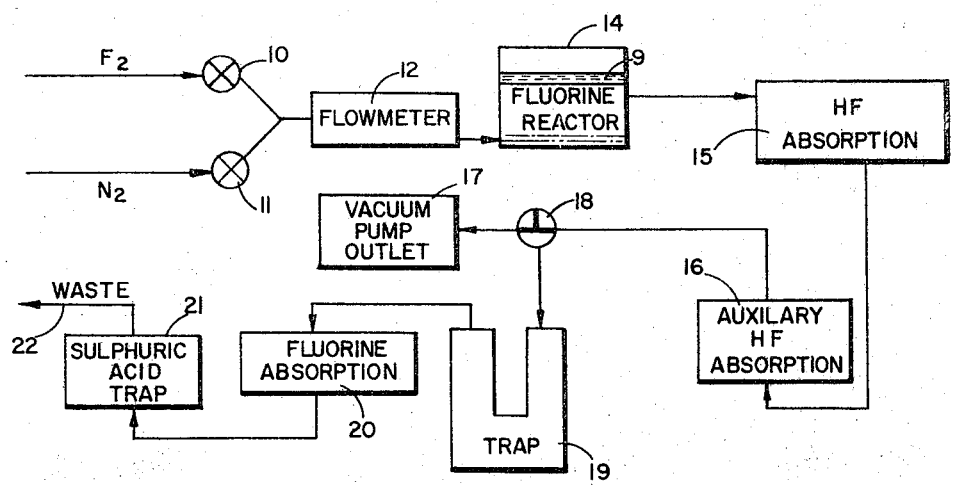
FIG. 1 is a flow diagram of the process of making difluoramine.

FIGURE 1 is a flow diagram of the method of making difluoramine and shows the entry of the hereinafter described amounts of fluorine gas and nitrogen gas which are metered by valves 10 and 11 into a glass or Pyrex flow meter 12 which measures the rate of flow of the gases into a reactor 14. The solid to be fluorinated is placed on a grid 9 in a reactor 14 which is preferably of stainless steel and arranged so that any liquid formed drops below the grid and collects in the bottom of the reactor adjacent to the gas inlet tube. Prior to the commencement of actual fluorination the sysem shown in FIG. 1 is flushed with nitrogen and cooling baths employed where necessary. The reactor 14 may be cooled with low temperature water. Measured flows of fluorine and nitrogen are passed into the reactor 14 forming the reactor liquid containing difluoramine and the exit gas passed into hydrogen fluoride absorbers 15 and 16 which contain sodium fluoride as the absorbing agent. The gases then pass through a cooled U-trap 19 in which gaseous by-products are condensed, which may contain some residual difluoramine, a fluorine absorber 20 containing potassium or sodium chloride and a sulfuric acid trap 21. Residual gases from the trap 21 are passed to waste through line 22. The trap 19 is detachable from the overall system. Three-way valve 18 is suitably positioned when removing trap 19 from the system so that vacuum pump outlet 17 may remove gases being formed in reactor 14.

It has been found that the preferred temperature within the reactor 14 is approximately 0° C. The temperature may range, however, from approximately −30° C. to +40° C. for satisfactory results. The pressure in the reactor 14 is generally atmospheric although it has been determined that a pressure range of from about one-half atmosphere to two atmospheres is a preferable pressure range usable in the described fluorination process. The particular time of fluorination is dependent upon the size of the sample, the gas flow rate and the particular particle size and shape of the starting material.

The ratio of the mols of fluorine to mols of urea, which is a preferred starting material, is in the range of from about 0.5:1 to about 3.0:1. About 0.8 mol of $F_2$ per mol of urea is a preferred ratio. The ratio of mols of $F_2$ to mols of $N_2$ flowing through flow meter 12 is in a preferred range of from 5:1 to 7:1. The ratio of $N_2$ to $F_2$ may encompass a ratio of $N_2$ to $F_2$, on the mol basis of from about 3:1 to 15:1. The rate of reaction of the fluorine and urea is practically instantaneous. Due to the reaction being exothermic, fluorine is passed into the reactor slowly, in the case of the hereinafter described examples at rates of 0.1–2 mols/hour.

While urea is the preferred starting material other nitrogen compounds containing carbon, nitrogen and hydrogen atoms such as diurea, diuret, aminoguanidine, diaminourea, 5-aminotetrazole, guanidine hydrochloride and semicarbazide hydrochloride may be employed as the starting material. Any inert gas such as argon, krypton, nitrogen or carbon dioxide may be employed. If the present invention is performed at very low pressures the inert gases may be dispensed with.

Figure 2:
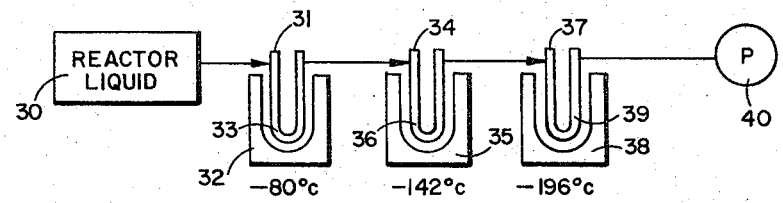
FIG. 2 is a typical trap apparatus for isolating quantities of difluoramine.

FIGURE 2 shows a typical trap apparatus useful in fractionating the fluorinated nitrogen compound collected in the reactor 14 shown in FIG. 1. The liquid from reactor 14 is heated in vessel 30 to about room temperature and is thereby partly changed into gaseous form. The gases are communicated to a U-trap 31 having a lower portion 33 situated in a vessel 32 providing a temperature of about −80° C. Upon fractionation, i.e. condensation of particular gaseous components, at this particular temperature the gases remaining are communicated to a U-trap 34 having a bottom portion 36 in a vessel 35 held at −142° C. The remaining gases are then communicated to a U-trap 37 having a bottom portion 39 situated in a vessel 38 having a temperature of −196° C. Flow of the gases through the multiple traps is accomplished by a pump 40. The solid material collected in the −142° C. trap is difluoramine while the solid material, containing HNCO and other whitish refractory material, in the −80° C. trap is usable as the catalyst material for the preparation of tetrafluorohydrazine. Care must be taken with respect to the −196° C. trap since any solid difluoramine formed therein tends to detonate spontaneously.

Table I shows various runs involving the fluorination of the applicable nitrogen compounds.

TABLE I

| Run No. | Mols Urea | Mols F$_2$ | Fluorine Flow Rate, g./min. | Time (hrs.) | Percent F$_2$ |
|---|---|---|---|---|---|
| 23 | 0.54 | 2.7 | 0.15 | 11.8 | 44.7 |
| 24 | 0.82 | 3.1 | 0.15 | 13 | 56.6 |
| 25 | 0.62 | 2.6 | 0.15 | 11 | 50.1 |
| 26 | 1.67 | 6.3 | 0.19 | 20.8 | 53.2 |
| 27 | 1.67 | 3.9 | 0.21 | 11.5 | 48.7 |
| 28 | 0.15 | 0.36 | 0.08 | 3 | (*) |
| 29 | 0.35 | 0.66 | 0.11 | 3.5 | 60.0 |
| 3 | G 0.20 | 0.72 | 0.06 | 4.6 | 48.3 |
| 2 | B 0.10 | 0.68 | ¹ 0.18 | 3.8 | (*) |
| 18 | A 0.02 | 0.73 | ¹ 0.27 | 3.0 | (*) |
| 20 | S 0.04 | 0.70 | 0.08 | 5.3 | (*) |

¹ Mol/hr.

wherein G is a guanidine hydrochloride, B is biurea, A is 5-aminotetrazole and S is semicarbazide hydrochloride, and each is substituted for the urea of the first seven examples.

Table II shows the physical properties of the difluoramine formed by the disclosed process and serves to identify the product formed.

TABLE II

*Physical properties of difluoramine*

Molecular weight _____ 53.02.
Color:
    Gas _____ Colorless.
    Liquid _____ Water white.
    Solid _____ White.
Odor _____ Strong, similar to $N_2O_4$.
Melting point _____ −116±3° C.
Boiling point _____ −23.6° C.
Density:
    Liquid 20° C.
      (extrap.) _____ 1.384.
    Liquid −25° C.
      (extrap.) _____ 1.474.
Vapor pressure equation
  (−80° to −40° C.) ___ $\log_{10} p_{mm} = -1291.8/t + 8.058$.
Extrap. vapor pressure:
  At 0° C. (32° F.) ___ 48.7 p.s.i.a.
  At 20° C. (68° F.) __ 108 p.s.i.a.
  At 50° C. (122° F.) _ 397 p.s.i.a.
Density equation[1] _____ $D = 1.424 - .00202t$.
Coefficient of cubical
  expansion _____ $1.3 \times 10^{-3} C^{-1}$.
Heat of vaporization ____ 5.91 kcal./mol.

[1] $t = °$ C.

For purposes of further identification of the product formed the following mass spectrum (Table III) using a Consolidated Electrodynamics Model 21–105C mass spectrometer is presented.

TABLE III

*Mass spectrum of difluoramine*

| Mass No. | Sample 1 | | Sample 2 | |
|---|---|---|---|---|
| | Peak H | Pattern Coef. | Peak H | Pattern Coef. |
| 14 | 129.3 | 28.11 | 129.0 | 28.92 |
| 15 | 70.5 | 15.32 | 69.9 | 15.67 |
| 19 | 45.96 | 9.99 | 45.9 | 10.29 |
| 20 | 12.1 | 2.63 | 13.0 | 2.91 |
| 28 | 10.79 | 2.35 | 10.73 | 2.41 |
| 33 | 233.64 | 50.79 | 228.75 | 51.29 |
| 34 | 680.0 | 147.83 | 666.0 | 149.33 |
| 52 | 10.1 | 2.20 | 10.0 | 2.24 |
| 53 | 460.0 | 100.00 | 446.0 | 100.0 |

The following detailed specific mode of practicing the present process, supplementing the data heretofore given both with regard to FIG. 1 and Table I, is as follows:

Fluorination of urea:
    Urea, weight=36.3 g. (0.60 mol).
    Fluorine, weight=18.4 g. (0.48 mol)=0.12 mols/hr.
    Fluorine:nitrogen=1:10.
    Fluorination time=4.0 hr.
    Reaction bath temperature=0° C.
    Trap: glass, following HF absorbers, preceding $F_2$ absorber; bath temperature −126° to −100° C.

The urea was dried for two days at 105° C. The HF absorbers were charged with reagent grade sodium fluoride (dried at 300° C.). The reagent grade was available as a powder and it was necessary to suspend layers of it on Pyrex wool to permit the free flow of gas. The reactor contained 50.5 g. of a milky orange liquid which included difluoramine and which was stored in polyethylene at Dry Ice temperature. The entire contents of the U-trap was 6.5 cc. brown gas with an infrared spectrum indicating only silicon tetrafluoride and nitrogen dioxide. The liquid product was found to contain 35.0 percent total fluorine and about 15.0 percent (average of 14.1 and 15.8) active fluorine. Ninety percent of the fluorine used was present in the product.

*Fractionation of fluorinated urea*

Fluorinated urea was distilled from a Kel-F coated flask through Pyrex into a Pyrex U-trap cooled with liquid nitrogen. The distillation was stopped after 40 minutes, at which time its rate was slow and the contents of the flask were entirely fluid. The more volatile components of the distillate were transferred to a high vacuum line (about 800 cc. gas plus 0.1 ml. liquid). This mixture was fractionated through a trap cooled to −142° C., the noncondensible portion consisting of only silicon tetrafluoride and carbon dioxide. The material which condensed at −142° C. was fractionated through −45° C., −112° C. and −142° C. The −45° C. condensate was mainly a very slightly volatile liquid with a small amount of gas whose infrared spectrum showed only a band at 2.9. The infrared spectrum of the −112° C. condensate, 3.9 cc., showed bands at 4.6, 8.0, 8.6, 8.8, 9.7 ($SiF_4$) and 11.0μ. The −142° C. condensate, 51.7 cc., was difluoramine, with a trace of silicon tetrafluoride and carbon dioxide. The material, noncondensible at −142° C., was refractionated several times to yield mixtures of silicon tetrafluoride and carbon dioxide with traces of difluoramine and 6.2 cc. gas, whose infrared spectrum indicated chiefly silicon tetrafluoride and tetrafluorohydrazine. The nearly pure difluoramine, 51.7 cc., was refractionated through −127° C. and −142° C. The −142° C. condensate, 1.9 cc., was pure difluoramine, and the gas noncondensible at −142° C., 5.4 cc., was nearly all silicon tetrafluoride and carbon dioxide.

In a further example a major amount of difluoramine condensed out in a −126° C. trap. Difluoramine can be recovered in traps within the range of from about −120° C. to about −150° C. The particular temperatures depend on the particular pressures employed.

Figure 3:
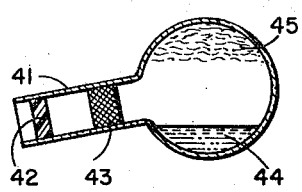
FIG. 3 is an apparatus for the preparation and recovery of tetrafluorohydrazine.

FIGURE 3 shows an apparatus for obtaining tetrafluorohydrazine from difluoramine. It comprises a flask 41, stoppered at 42 and containing a frozen ring 43 of difluoramine which was formed in the −142° C. or thereabouts cold trap above described. Contained in the bottom of the flask 41 is a catalyst material 44 which may be the insoluble solid refractory material from the −80° C. or thereabouts fractional condensation trap above described (believed to be HCNO polymers), or solid lithium hydride, or type 304 stainless steel or gaseous perchloryl fluoride $FClO_3$ or gaseous HCl. The amounts of these latter gases is not critical. A 4:1 ratio of difluoramine to $FClO_3$ is preferred. As the frozen ring or slug 43 is melted the gas formed contacts the catalyst material 44 forming $N_2F_4$ gas 45 within the flask. Yields as high as 67% have been obtained. Liquefication of this $N_2F_4$ gas makes the material useful in the aforesaid rocket propellant field.

A specific example of the practice of this process is: 14.5 cc. of difluoramine was introduced into an ampoule containing lithium hydride (4.1 mg.) in such a manner that the difluoramine formed a solid ring above the hydride. The ampoule was then stored in a Dewar containing a small amount of liquid nitrogen so that the reactants would warm slowly to room temperature. After 60 hours at room temperature, the gaseous products were removed and separated in the vacuum line. The solid product was tested with aqueous hydriodic acid and gave a negative test for oxidants. The composition of the gaseous product mixture is described in Table IV.

TABLE IV

*Gaseous products from difluoramine and lithium hydride*

| Product | Quantity, cc. | Method of Identification | Nitrogen Content (as $N_2$), cc. |
|---|---|---|---|
| $N_2$ | 1.2 | Mass spectrograph | 1.2 |
| $H_2$ | 8.0 | ___do___ | |
| $N_2F_4$ | 2.5 | Infrared spectrum | 2.5 |
| $HNF_2$ | 4.4 | ___do___ | 2.2 |
| Other | None | | |

Total nitrogen in products (as $N_2$), 5.9 cc.
Total nitrogen in reactants (as $N_2$), 7.2 cc.

For a further example lithium hydride (1.00 m. mol) and difluoramine (21.4 cc.; 0.96 m. mol) were combined and stored exactly as in the previous experiment. After standing 17 hours without apparent change, the reaction products were examined as before. Data are summarized in Table V.

TABLE V

*Reaction products from difluoramine with lithium hydride*

| Product | Quantity, cc. S.T.P. | How Isolated | Method of Identification |
|---|---|---|---|
| $N_2$ | 3.5 | Noncondensible | Mass spectrum. |
| $H_2$ | 11.0 | ___do___ | Do. |
| $HNF_2$ | 10.3 | Condensible at −142° C | Infrared spectrum. |
| $N_2F_4$ | 3.7 | Noncondensible at −142° C | Do. |
| LiH | 13.7 | Solid | $H_2$ evolution. |
| LiF | 14.7 | ___do___ | Chemical analysis. |

Noteworthy in this experiment is the smooth formation of 3.7 cc. tetrafluorohydrazine from 11.9 cc. difluoramine. This represents a 67 percent yield.

For a still further example, 2 cc. of difluoramine were stored in a stainless steel ampoule at room temperature. After several days it was found that about two-thirds of the difluoramine had been converted into tetrafluorohydrazine. Results of this are seen in Table VI.

TABLE VI

| Test No. | Quantity $HNF_2$ Introduced, cc. | Storage Duration, days | Quantity $HNF_2$ Recovered, cc. | Quantity $N_2F_4$ Formed, cc. |
|---|---|---|---|---|
| 1 | 2.0 | 6 | ca. 1.0 | ca. 0.5. |
| 2 | 3.8 | 23 | ca. 1.5 | ca. 1.0. |

Although the invention has been described and illustrated in detail, it is to be clearly understood that the same is by way of illustration and example only and is not to be taken by way of limitation, the spirit and scope of this invention being limited only by the terms of the appended claims.

We claim:
1. A method of preparing difluoramine comprising the steps of fluorinating, with elemental fluorine, a nitrogen compound selected from the group consisting of urea, biurea, biuret, aminoguanidine, diaminourea, 5-aminotetrazole, guanidine hydrochloride, and semicarbazide hydrochloride, heating the liquid products of said fluorinating step and fractionally condensing gaseous products of said heating step to obtain substantially pure difluoramine.

2. A method of preparing difluoramine comprising the steps of fluorinating urea at a temperature of from about −30° C. to about 40° C. with gaseous fluorine diluted with an inert gas to produce liquid products, heating the liquid products of said fluorinating step and separating by fractional condensation the gaseous products of said heating step to obtain substantially pure difluoramine.

3. A method of preparing difluoramine comprising the steps of drying urea, fluorinating said urea at approximately 0° C. at about atmospheric pressure with elemental fluorine, absorbing hydrogen fluoride gas formed during the action of said urea with said fluorine, collecting liquid formed during the fluorination step, heating said liquid to form gaseous compounds thereof and fractionally condensing said gaseous products at various temperatures within the range of from −80° C. to −190° C. whereby substantially pure difluoramine is present in one of the fractions condensed.

4. A method of preparing difluoramine comprising fluorinating urea with elemental fluorine wherein the ratio of mols of fluorine to mols of urea is in the range of from about 0.5:1 to about 3.0:1, and separating the products formed by said fluorination by fractionation to obtain a substantially pure fraction of difluoramine.

References Cited by the Examiner

Journal of the American Chemical Society, vol. 80, p. 5004, Sept. 20, 1958.

Ruff: "Angewandte Chemie," vol. 46, pp. 739–742 (1933).

Supplement to Mellor's Comprehensive Treatise on Inorganic and Theoretical Chemistry, Supplement II, Part I, Longmans, Green and Co., New York, N.Y., 1956, p. 59.

MILTON WEISSMAN, *Primary Examiner.*

MAURICE A. BRINDISI, OSCAR R. VERTIZ,
*Examiners.*

E. C. THOMAS, *Assistant Examiner.*